United States Patent
Doddapuneni et al.

(10) Patent No.: US 10,448,020 B2
(45) Date of Patent: *Oct. 15, 2019

(54) INTELLIGENT MSI-X INTERRUPTS FOR VIDEO ANALYTICS AND ENCODING

(71) Applicant: Intel Corporation, Santa Clara, CA (US)

(72) Inventors: Naveen Doddapuneni, Phoenix, AZ (US); Animesh Mishra, Pleasanton, CA (US); Jose M. Rodriguez, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,068

(22) Filed: Apr. 9, 2018

(65) Prior Publication Data
US 2018/0227581 A1    Aug. 9, 2018

Related U.S. Application Data

(63) Continuation of application No. 13/994,822, filed as application No. PCT/US2011/067448 on Dec. 28, 2011, now Pat. No. 9,973,752.

(51) Int. Cl.
| G06F 13/24 | (2006.01) |
| H04N 19/13 | (2014.01) |
| H04N 19/42 | (2014.01) |
| H04N 19/20 | (2014.01) |
| H04N 19/436 | (2014.01) |

(Continued)

(52) U.S. Cl.
CPC .......... *H04N 19/13* (2014.11); *H04N 19/137* (2014.11); *H04N 19/20* (2014.11); *H04N 19/42* (2014.11); *H04N 19/436* (2014.11); *H04N 19/87* (2014.11)

(58) Field of Classification Search
CPC .. H04N 19/0092; H04N 19/137; H04N 19/42; H04N 19/20; H04N 19/87; H04N 19/436
See application file for complete search history.

(56) References Cited

U.S. PATENT DOCUMENTS

| 5,896,167 A | 4/1999 | Omae et al. |
| 6,970,206 B1 | 11/2005 | Swan et al. |
| 7,725,637 B2 | 5/2010 | Kumar et al. |

(Continued)

FOREIGN PATENT DOCUMENTS

| CN | 104145244 | 11/2014 |
| EP | 1391827 | 2/2004 |

OTHER PUBLICATIONS

CN office action in corresponding CN application No. 201180075963.2 dated Oct. 31, 2018 (6 pages) [no English translation].

(Continued)

Primary Examiner — Jing-Yih Shyu
(74) Attorney, Agent, or Firm — Trop, Pruner & Hu, P.C.

(57) ABSTRACT

Video analytics may be used to assist video encoding by selectively encoding only portions of a frame and using, instead, previously encoded portions. Previously encoded portions may be used when succeeding frames have a level of motion less than a threshold. In such case, all or part of succeeding frames may not be encoded, increasing bandwidth and speed in some embodiments.

9 Claims, 9 Drawing Sheets

(51) Int. Cl.
*H04N 19/87* (2014.01)
*H04N 19/137* (2014.01)

(56) References Cited

U.S. PATENT DOCUMENTS

| | | | |
|---|---|---|---|
| 8,793,188 B2* | 7/2014 | Larkin | G06Q 20/20 705/44 |
| 2005/0249483 A1* | 11/2005 | Bramley | H04N 21/44020 386/231 |
| 2006/0013123 A1* | 1/2006 | Ryu | G11B 20/00 370/216 |
| 2006/0150071 A1 | 7/2006 | Chen | |
| 2006/0294277 A1 | 12/2006 | Tetrick | |
| 2008/0162762 A1 | 7/2008 | Neiger | |
| 2008/0276027 A1 | 11/2008 | Hagita | |
| 2011/0029101 A1* | 2/2011 | Castro Scorsi | G05B 19/4183 700/73 |
| 2011/0066783 A1 | 3/2011 | Konireddygari | |
| 2011/0093637 A1 | 4/2011 | Gupta | |
| 2011/0153893 A1 | 7/2011 | Foong | |
| 2011/0211036 A1 | 9/2011 | Tran | |
| 2011/0246686 A1* | 10/2011 | Cavanagh, Jr. | G06F 13/28 710/22 |

OTHER PUBLICATIONS

Tu, Cheng-Chun, "Interrupts Delivery in a Multi-host Environment", Sep. 25, 2012, Retrieved from http://www3.cs.stonybrook.edu/.about.live3/files/pcie-interrupt-delivery.-pdf.

"Xilinx PCI Express Interrupt Debugging Guide" by Xilinx, Jan. 15, 2014, retrieved from http://www.xillinx.com/Attachment/Xilinx_Answer_58495_PCIe_Interrupt_Debu- gging_Guide.pdf.

PCT International Search Report and Written Opinion issued in corresponding PCT/US2011/067448 dated Aug. 27, 2012 (9 pages).

CN office action in corresponding CN application No. 201180075963.2 dated Feb. 4, 2017.

CN office action in corresponding CN application No. 201180075963.2 dated Sep. 26, 2017 (4 pages).

CN office action in corresponding CN patent application No. 201180075963.2 dated Mar. 20, 2018 (4 pages) [no English translation].

EP office action in corresponding EP application No. 11878478.4 dated Jul. 22, 2015.

EP office action in corresponding EP application No. 11878478.4 dated Oct. 13, 2016.

\* cited by examiner

INTELLIGENT MSI-X INTERRUPTS FOR VIDEO ANALYTICS AND ENCODING

CROSS-REFERENCE TO RELATED APPLICATIONS

This application is a continuation of U.S. patent application Ser. No. 13/994,822, filed on Jun. 17, 2013, issued as U.S. Pat. No. 9,973,752 on May 15, 2018, which claims priority to a 371 application PCT/US2011/67448, filed on Dec. 28, 2011, hereby incorporated by reference herein This relates generally to computers and, particularly, to video processing.

There are a number of applications in which video must be processed and/or stored. One example is video surveillance, wherein one or more video feeds may be received, analyzed, and processed for security or other purposes. Another conventional application is for video conferencing.

Typically, general purpose processors, such as central processing units, are used for video processing. In some cases, a specialty processor, called a graphics processor, may assist the central processing unit.

Video analytics involves obtaining information about the content of video information. For example, the video processing may include content analysis, wherein the content video is analyzed in order to detect certain events or occurrences or to find information of interest.

Message signaled interrupts or MSI is a technique for generating an interrupt. Typically, each device has an interrupt pin asserted when the device wants to interrupt a host central processing unit. In the Peripheral Component Interconnect Express specification, there are no separate interrupt pins. Instead special messages allow emulation of a pin assertion or de-assertion. Message signaled interrupts allow the device to write a small amount of data to a special address in memory space. The chipset then delivers an interrupt to the central processing unit.

MSI-X permits a device to allocate up to two thousand forty eight interrupts. MSI-X is specified in the Peripheral Component Interconnect Express Base specifications, revisions 1.0a and 1.1 in section 6.1. MSI-X allows a large number of interrupts, giving each interrupt a separate target address and an identifying data word. It uses 64-bit addressing and interrupt masking.

DETAILED DESCRIPTION

In accordance with some embodiments, multiple streams of video may be processed in parallel. The streams of video may be encoded at the same time video analytics are being implemented. Moreover, each of a plurality of streams may be encoded, in one shot, at the same time each of a plurality of streams are being subjected to video analytics. In some embodiments, the characteristics of the encoding or the analytics may be changed by the user on the fly while encoding or analytics are already being implemented.

While an example of an embodiment is given in which video analytics are used, in some embodiments, video analytics are only optional and may or may not be used.

Figure 1:
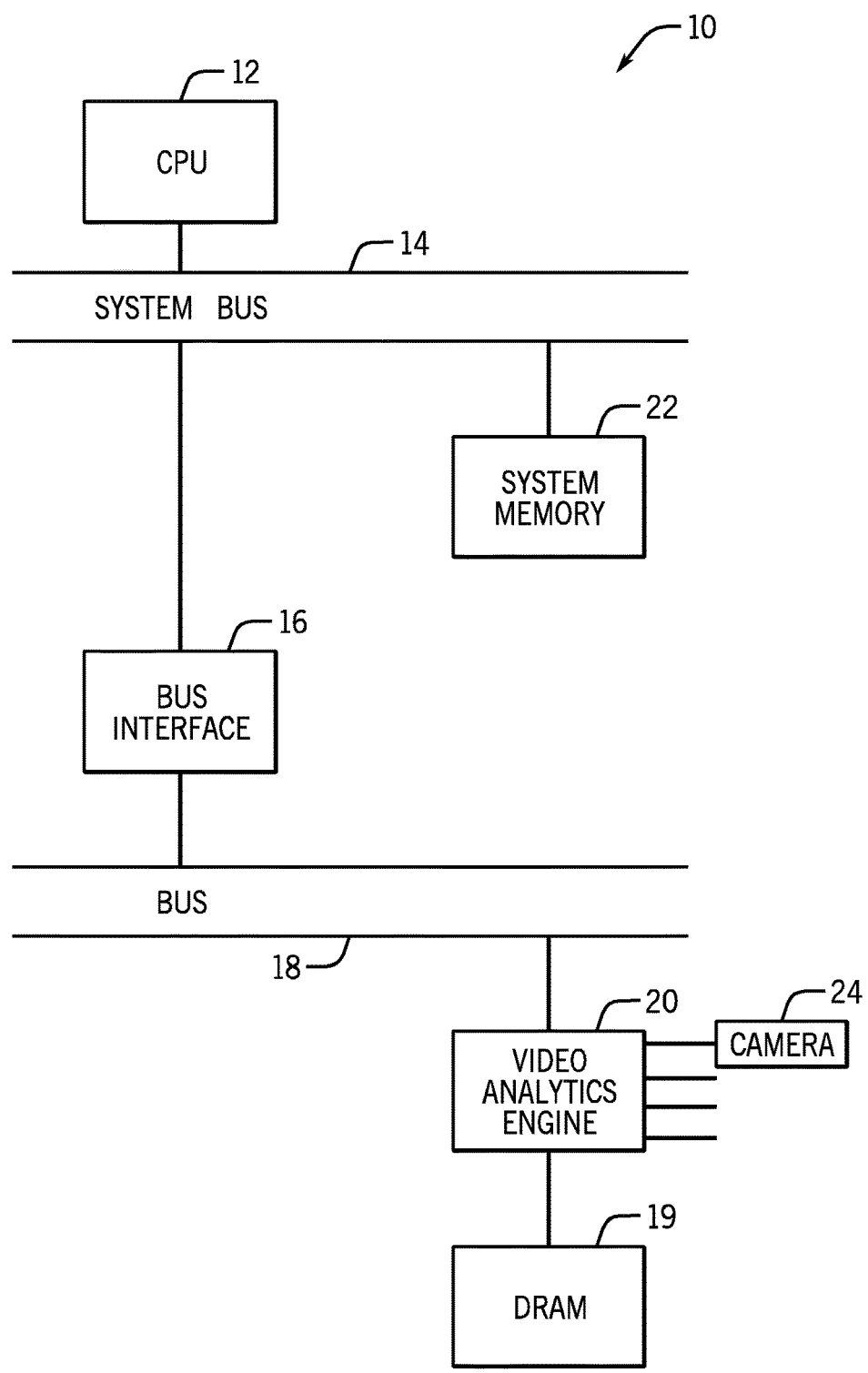
FIG. 1 is a system architecture in accordance with one embodiment of the present invention.

Referring to FIG. 1, a computer system 10 may be any of a variety of computer systems, including those that use video analytics, such as video surveillance and video conferencing application, as well as embodiments which do not use video analytics. The system 10 may be a desk top computer, a server, a laptop computer, a mobile Internet device, or a cellular telephone, to mention a few examples.

The system 10 may have one or more host central processing units 12, coupled to a system bus 14. A system memory 22 may be coupled to the system bus 14. While an example of a host system architecture is provided, the present invention is in no way limited to any particular system architecture.

The system bus 14 may be coupled to a bus interface 16, in turn, coupled to a conventional bus 18. In one embodiment, the Peripheral Component Interconnect Express (PCIe) bus may be used, but the present invention is in no way limited to any particular bus.

A video analytics engine 20 may be coupled to the host via a bus 18. In one embodiment, the video analytics engine may be a single integrated circuit which provides both encoding and video analytics. In one embodiment, the integrated circuit may use embedded Dynamic Random Access Memory (EDRAM) technology. However, in some embodiments, either encoding or video analytics may be dispensed with. In addition, in some embodiments, the video analytics engine 20 may include a memory controller that controls an on-board integrated two dimensional matrix memory, as well as providing communications with an external memory.

Thus, in the embodiment illustrated in FIG. 1, the video analytics engine 20 communicates with a local dynamic random access memory (DRAM) 19. Specifically, the video analytics engine 20 may include a memory controller 50 for accessing the memory 19. Alternatively, the video analytics engine 20 may use the system memory 22 and may include a direct connection to system memory.

Also coupled to the video analytics engine 20 may be one or more cameras 24. In some embodiments, up to four simultaneous video inputs may be received in standard definition format. In some embodiments, one high definition input may be provided on three inputs and one standard definition may be provided on the fourth input. In other embodiments, more or less high definition inputs may be provided and more or less standard definition inputs may be provided. As one example, each of three inputs may receive ten bits of high definition input data, such as R, G and B inputs or Y, U and V inputs, each on a separate ten bit input line.

Figure 2:
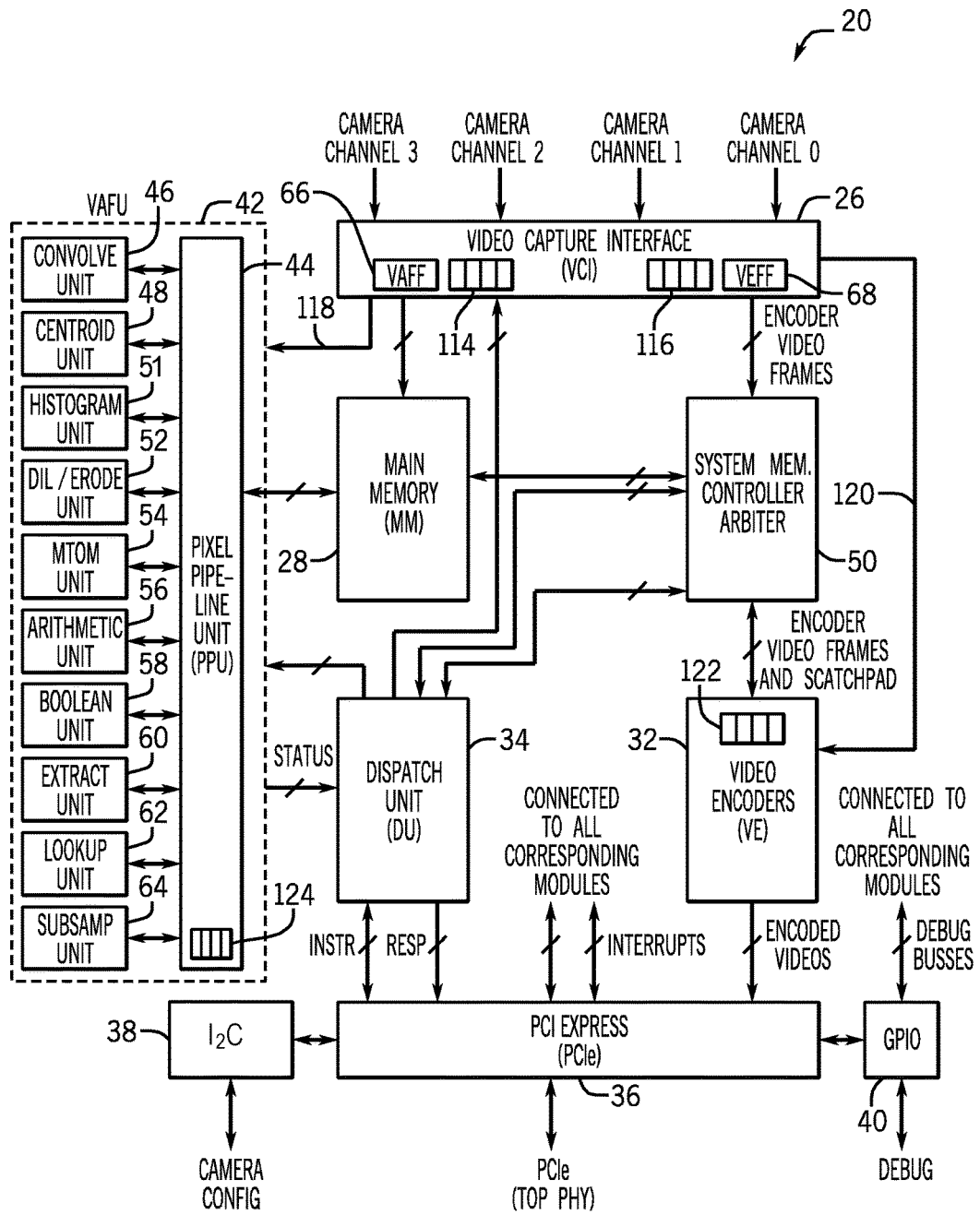
FIG. 2 is a circuit depiction for the video analytics engine shown in FIG. 1 in accordance with one embodiment.

One embodiment of the video analytics engine 20, shown in FIG. 2, is depicted in an embodiment with four camera channel inputs at the top of the page. The four inputs may be received by a video capture interface 26. The video capture interface 26 may receive multiple simultaneous video inputs in the form of camera inputs or other video information, including television, digital video recorder, or media player inputs, to mention a few examples.

The video capture interface automatically captures and copies each input frame. One copy of the input frame is provided to the VAFF unit 66 and the other copy may be provided to VEFF unit 68. The VEFF unit 68 is responsible for storing the video on the external memory, such as the memory 22, shown in FIG. 1. The external memory may be coupled to an on-chip system memory controller/arbiter 51 in one embodiment. In some embodiments, the storage on the external memory may be for purposes of video encoding. Specifically, if one copy is stored on the external memory, it can be accessed by the video encoders 32 for encoding the information in a desired format. In some embodiments, a plurality of formats are available and the system may select a particular encoding format that is most desirable.

As described above, in some cases, video analytics may be utilized to improve the efficiency of the encoding process implemented by the video encoders 32. Once the frames are encoded, they may be provided via the PCI Express bus 36 to the host system.

At the same time, the other copies of the input video frames are stored on the two dimensional matrix or main memory 28. The VAFF may process and transmit all four input video channels at the same time. The VAFF may include four replicated units to process and transmit the video. The transmission of video for the memory 28 may use multiplexing. Due to the delay inherent in the video retrace time, the transfers of multiple channels can be done in real time, in some embodiments.

Storage on the main memory may be selectively implemented non-linearly or linearly. In conventional, linear addressing one or more locations on intersecting addressed lines are specified to access the memory locations. In some cases, an addressed line, such as a word or bitline, may be specified and an extent along that word or bitline may be indicated so that a portion of an addressed memory line may be successively stored in automated fashion.

In contrast, in two dimensional or non-linear addressing, both row and column lines may be accessed in one operation. The operation may specify an initial point within the memory matrix, for example, at an intersection of two addressed lines, such as row or column lines. Then a memory size or other delimiter is provided to indicate the extent of the matrix in two dimensions, for example, along row and column lines. Once the initial point is specified, the entire matrix may be automatically stored by automated incrementing of addressable locations. In other words, it is not necessary to go back to the host or other devices to determine addresses for storing subsequent portions of the memory matrix, after the initial point. The two dimensional memory offloads the task of generating addresses or substantially entirely eliminates it. As a result, in some embodiments, both required bandwidth and access time may be reduced.

Basically the same operation may be done in reverse to read a two dimensional memory matrix. Alternatively, a two dimensional memory matrix may be accessed using conventional linear addressing as well.

While an example is given wherein the size of the memory matrix is specified, other delimiters may be provided as well, including an extent in each of two dimensions (i.e. along word and bitlines). The two dimensional memory is advantageous with still and moving pictures, graphs, and other applications with data in two dimensions.

Information can be stored in the memory 28 in two dimensions or in one dimension. Conversion between one and two dimensions can occur automatically on the fly in hardware, in one embodiment.

In some embodiments, video encoding of multiple streams may be undertaken in a video encoder at the same time the multiple streams are also being subjected to analytics in the video analytics functional unit 42. This may be implemented by making a copy of each of the streams in the video capture interface 26 and sending one set of copies of each of the streams to the video encoders 32, while another copy goes to the video analytics functional unit 42.

In one embodiment, a time multiplexing of each of the plurality of streams may be undertaken in each of the video encoders 32 and the video analytics functional unit 42. For example, based on user input, one or more frames from the first stream may be encoded, followed by one or more frames from the second stream, followed by one or more streams from the next stream, and so on. Similarly, time multiplexing may be used in the video analytics functional unit 42 in the same way wherein, based on user inputs, one or more frames from one stream are subjected to video analytics, then one or more frames from the next stream, and so on. Thus, a series of streams can be processed at substantially the same time, that is, in one shot, in the video encoders and video analytics functional unit.

In some embodiments, the user can set the sequence of which stream is processed first and how many frames of each stream are processed at any particular time. In the case of the video encoders and the video analytics engine, as the frames are processed, they can be output over the PCI Express bus 36.

The context of each stream in the video encoder may be retained in a register dedicated to that stream in the register set 122, which may include registers for each of the streams. The register set 122 may record the characteristics of the encoding which have been specified in one of a variety of ways, including a user input. For example, the resolution, compression rate, and the type of encoding that is desired for each stream can be recorded. Then, as the time multiplexed encoding occurs, the video encoder can access the correct characteristics for the current stream being processed from the register 116, for the correct stream.

Similarly, the same thing can be done in the video analytics functional unit 42 using the register set 124. In other words, the characteristics of the video analytics processing or the encoding per stream can be recorded within the registers 124 and 122 with one register reserved for each stream in each set of registers.

In addition, the user or some other source can direct that the characteristics be changed on the fly. By "on the fly," it is intended to refer to a change that occurs during analytics processing, in the case of the video analytics functional unit 42 or in the case of encoding, in the case of the video encoders 32.

When a change comes in when a frame is being processed, the change may be initially recorded in shadow registers 116, for the video encoders and shadow registers 114, for the video analytics functional unit 42. Then, as soon as the frame (or designated number of frames) is completed, the video encoder 32 checks to see if any changes have been stored in the registers 116. If so, the video encoder transfers those changes over the path 120 to the registers 122, updating the new characteristics in the registers appropriate for each stream that had its encoding characteristics changed on the fly.

Again, the same on the fly changes may be done in the video analytics functional unit 42, in one embodiment. When an on the fly change is detected, the existing frames (or an existing set of work) may be completed using the old characteristics, while storing the changes in the shadow registers 114. Then at an opportune time, after a workload or frame has completed processing, the changes may be transferred from the registers 114 over the bus 118 to the video analytics functional unit 42 for storage in the registers 124, normally replacing the characteristics stored for any particular stream in separate registers among the registers 124. Then, once the update is complete, the next processing load uses the new characteristics.

Figure 6:
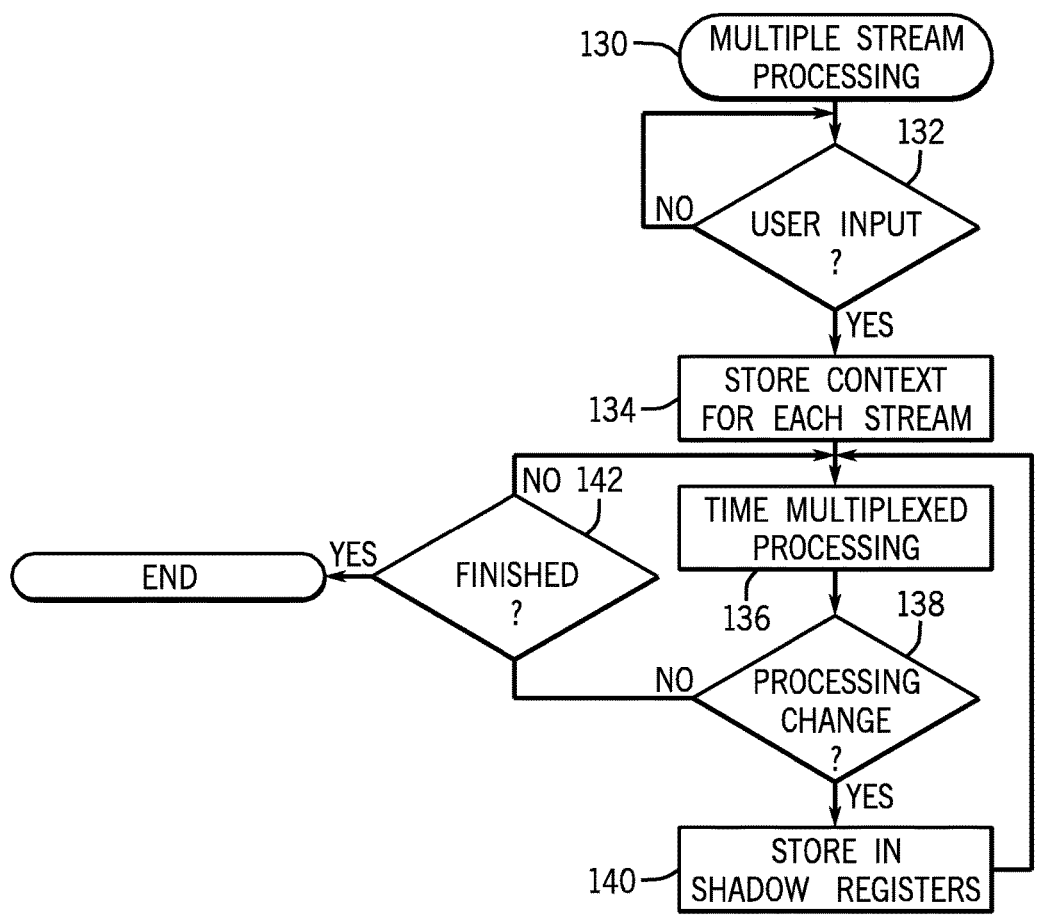
FIG. 6 is a flow chart for another embodiment.

Thus, referring to FIG. 6, the sequence 130 may be implemented in software, firmware, and/or hardware. In software or firmware based embodiments, the sequence may be implemented by computer executed instructions stored in a non-transitory computer readable medium, such as an optical, magnetic, or semiconductor memory. For example, in the case of the video encoder 32, the sequence may be stored in a memory within the encoder and, in the case of the analytics functional unit, they may be stored, for example in the pixel pipeline unit 44, in one embodiment.

Initially, the sequence waits for user input of context instructions for encoding or analytics. The flow may be the same, in some embodiments, for analytics and encoding. Once the user input is received, as determined in diamond 132, the context is stored for each stream in an appropriate register 122 or 124, as indicated in block 134. Then the time multiplexed processing begins, as indicated in block 136. During that processing, a check at diamond 138 determines whether there has been any processing change instructions. If not, a check at diamond 142 determines whether the processing is completed. If not, the time multiplexed processing continues.

If a processing change has been received, it may be stored in the appropriate shadow registers 114 or 116, as indicated in block 140. Then, when a current processing task is completed, the change can be automatically implemented in the next set of operations, be it encoding, in the case of video encoders 32 or analytics, in the case of the video analytics functional unit 42.

In some embodiments, the frequency of encoding may change with the magnitude of the load on the video encoder. Generally, the encoder runs fast enough that it can complete encoding of one frame before the next frame is read out of the memory. In many cases, the encoding engine may be run at a faster speed than needed to encode one frame or set of frames before the next frame or set of frames has run out of memory.

The context registers may store any necessary criteria for doing the encoding or analytics including, in the case of the video encoder, resolution, encoding type, and rate of compression. Generally, the processing may be done in a round robin fashion proceeding from one stream or channel to the next. The encoded data is then output to the Peripheral Components Interconnect (PCI) Express bus 36, in one embodiment. In some cases, buffers associated with the PCI Express bus may receive the encoding from each channel. Namely, in some embodiments, a buffer may be provided for each video channel in association with the PCI Express bus. Each channel buffer may be emptied to the bus controlled by an arbiter associated with the PCI Express bus. In some embodiments, the way that the arbiter empties each channel to the bus may be subject to user inputs.

Figure 3:
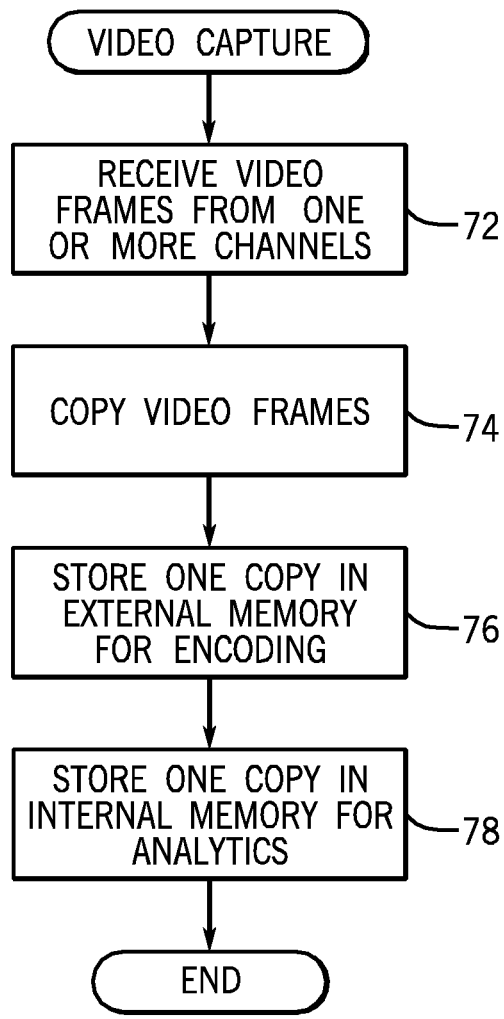
FIG. 3 is a flow chart for video capture in accordance with one embodiment of the present invention.

Thus, referring to FIG. 3, a system for video capture may be implemented in hardware, software, and/or firmware. Hardware embodiments may be advantageous, in some cases, because they may be capable of greater speeds. As indicated in block 72, the video frames may be received from one or more channels. Then the video frames are copied, as indicated in block 74. Next, one copy of the video frames is stored in the external memory for encoding, as indicated in block 76. The other copy is stored in the internal or the main memory 28 for analytics purposes, as indicated in block 78.

Figure 4:
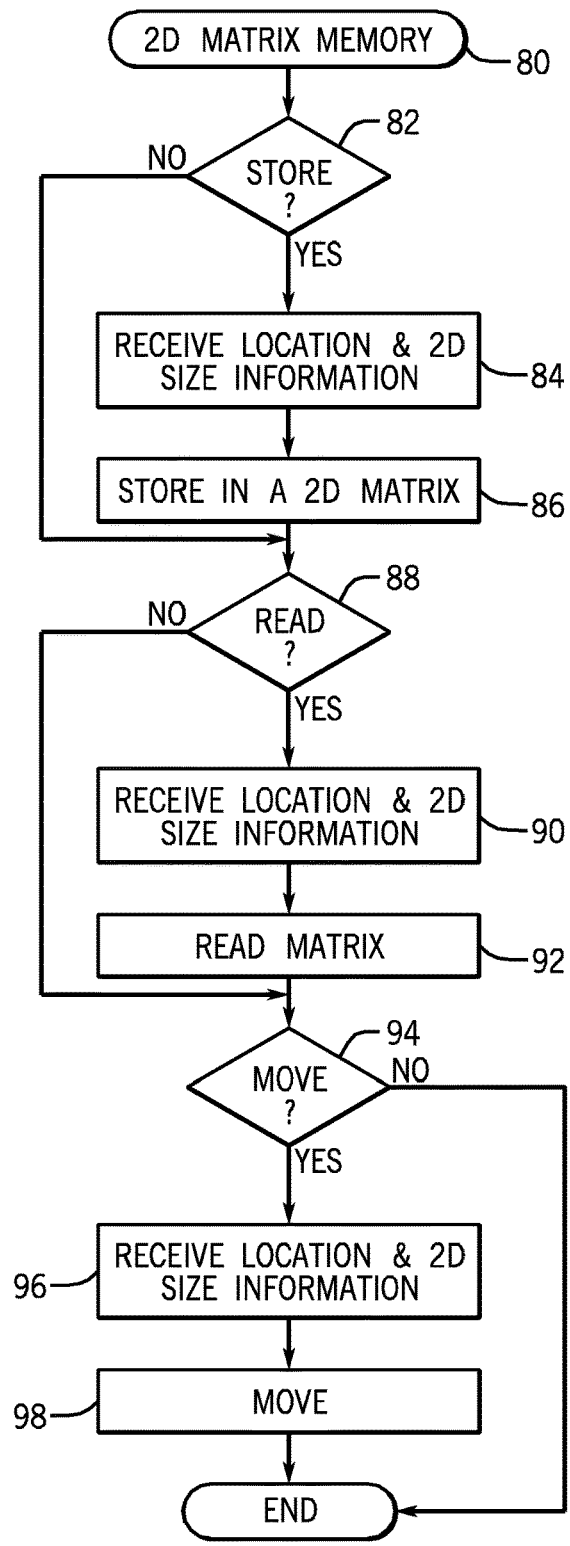
FIG. 4 is a flow chart for a two dimensional matrix memory in accordance with one embodiment.

Referring next to the two dimensional matrix sequence 80, shown in FIG. 4, a sequence may be implemented in software, firmware, or hardware. Again, there may be speed advantages in using hardware embodiments.

Initially, a check at diamond 82 determines whether a store command has been received. Conventionally, such commands may be received from the host system and, particularly, from its central processing unit 12. Those commands may be received by a dispatch unit 34, which then provides the commands to the appropriate units of the video analytics engine 20, used to implement the command. When the command has been implemented, in some embodiments, the dispatch unit reports back to the host system.

If a store command is involved, as determined in diamond 82, an initial memory location and two dimensional size information may be received, as indicated in block 84. Then the information is stored in an appropriate two dimensional matrix, as indicated in block 86. The initial location may, for example, define the upper left corner of the matrix. The store operation may automatically find a matrix within the memory 28 of the needed size in order to implement the operation. Once the initial point in the memory is provided, the operation may automatically store the succeeding parts of the matrix without requiring additional address computations, in some embodiments.

Conversely, if a read access is involved, as determined in diamond 88, the initial location and two dimensional size information is received, as indicated in block 90. Then the designated matrix is read, as indicated in block 92. Again, the access may be done in automated fashion, wherein the initial point may be accessed, as would be done in conventional linear addressing, and then the rest of the addresses are automatically determined without having to go back and compute addresses in the conventional fashion.

Finally, if a move command has been received from the host, as determined in block 94, the initial location and two dimensional size information is received, as indicated in block 96, and the move command is automatically implemented, as indicated in block 98. Again, the matrix of information may be automatically moved from one location to another, simply by specifying a starting location and providing size information.

Referring back to FIG. 2, the video analytics functional unit 42 may be coupled to the rest of the system through a pixel pipeline unit 44. The unit 44 may include a state machine that executes commands from the dispatch unit 34. Typically, these commands originate at the host and are implemented by the dispatch unit. A variety of different analytics units may be included based on application. In one embodiment, a convolve unit 46 may be included for automated provision of convolutions.

The convolve command may include both a command and arguments specifying a mask, reference or kernel so that a feature in one captured image can be compared to a reference two dimensional image in the memory 28. The command may include a destination specifying where to store the convolve result.

In some cases, each of the video analytics units may be a hardware accelerator. By "hardware accelerator," it is intended to refer to a hardware device that performs a function faster than software running on a central processing unit.

In one embodiment, each of the video analytics units may be a state machine that is executed by specialized hardware dedicated to the specific function of that unit. As a result, the units may execute in a relatively fast way. Moreover, only one clock cycle may be needed for each operation implemented by a video analytics unit because all that is necessary is to tell the hardware accelerator to perform the task and to provide the arguments for the task and then the sequence of operations may be implemented, without further control from any processor, including the host processor.

Other video analytics units, in some embodiments, may include a centroid unit 48 that calculates centroids in an automated fashion, a histogram unit 51 that determines histograms in automated fashion, and a dilate/erode unit 52.

The dilate/erode unit 52 may be responsible for either increasing or decreasing the resolution of a given image in automated fashion. Of course, it is not possible to increase the resolution unless the information is already available, but, in some cases, a frame received at a higher resolution may be processed at a lower resolution. As a result, the frame may be available in higher resolution and may be transformed to a higher resolution by the dilate/erode unit 52.

The Memory Transfer of Matrix (MTOM) unit 54 is responsible for implementing move instructions, as described previously. In some embodiments, an arithmetic unit 56 and a Boolean unit 58 may be provided. Even though these same units may be available in connection with a central processing unit or an already existent coprocessor, it may be advantageous to have them onboard the video analytics engine 20, since their presence on-chip may reduce the need for numerous data transfer operations from the video analytics engine 20 to the host and back. Moreover, by having them onboard the video analytics engine 20, the two dimensional matrix or main memory may be used in some embodiments.

An extract unit 60 may be provided to take vectors from an image. A lookup unit 62 may be used to lookup particular types of information to see if it is already stored. For example, the lookup unit may be used to find a histogram already stored. Finally, the subsample unit 64 is used when the image has too high a resolution for a particular task. The image may be subsampled to reduce its resolution.

In some embodiments, other components may also be provided including an I$_2$C interface 38 to interface with camera configuration commands and a general purpose input/output device 40 connected to all the corresponding modules to receive general inputs and outputs and for use in connection with debugging, in some embodiments.

Figure 5:
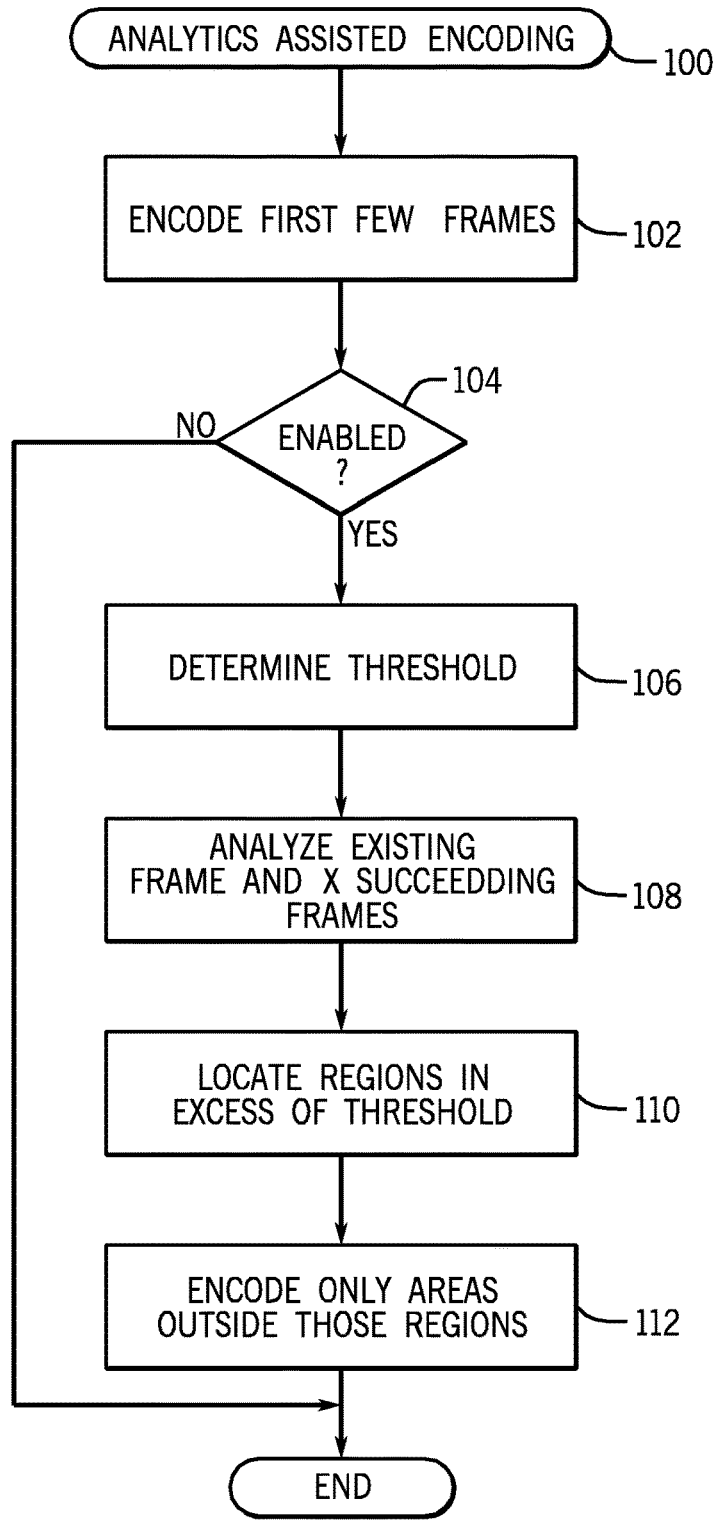
FIG. 5 is a flow chart for analytics assisted encoding in accordance with one embodiment.

Referring to FIG. 5, an analytics assisted encoding scheme 100 may be implemented, in some embodiments. The scheme may be implemented in software, firmware and/or hardware. However, hardware embodiments may be faster. The analytics assisted encoding may use analytics capabilities to determine what portions of a given frame of video information, if any, should be encoded. As a result, some portions or frames may not need to be encoded in some embodiments and, as one result, speed and bandwidth may be increased.

In some embodiments, what is or is not encoded may be case specific and may be determined on the fly, for example, based on available battery power, user selections, and available bandwidth, to mention a few examples. More particularly, image or frame analysis may be done on existing frames versus ensuing frames to determine whether or not the entire frame needs to be encoded or whether only portions of the frame need to be encoded. This analytics assisted encoding is in contrast to conventional motion estimation based encoding which merely decides whether or not to include motion vectors, but still encodes each and every frame.

In some embodiments of the present invention, successive frames are either encoded or not encoded on a selective basis and selected regions within a frame, based on the extent of motion within those regions, may or may not be encoded at all. Then, the decoding system is told how many frames were or were not encoded and can simply replicate frames as needed.

Referring to FIG. 5, a first frame or frames may be fully encoded at the beginning, as indicated in block 102, in order to determine a base or reference. Then, a check at diamond 104 determines whether analytics assisted encoding should be provided. If analytics assisted encoding will not be used, the encoding proceeds as is done conventionally.

If analytics assisted encoding is provided, as determined in diamond 104, a threshold is determined, as indicated in block 106. The threshold may be fixed or may be adaptive, depending on non-motion factors such as the available battery power, the available bandwidth, or user selections, to mention a few examples. Next, in block 108, the existing frame and succeeding frames are analyzed to determine whether motion in excess of the threshold is present and, if so, whether it can be isolated to particular regions. To this end, the various analytics units may be utilized, including, but not limited to, the convolve unit, the erode/dilate unit, the subsample unit, and the lookup unit. Particularly, the image or frame may be analyzed for motion above a threshold, analyzed relative to previous and/or subsequent frames.

Then, as indicated in block 110, regions with motion in excess of a threshold may be located. Only those regions may be encoded, in one embodiment, as indicated in block 112. In some cases, no regions on a given frame may be encoded at all and this result may simply be recorded so that the frame can be simply replicated during decoding. In general, the video encoder provides information in a header or other location about what frames were encoded and whether frames have only portions that are encoded. The address of the encoded portion may be provided in the form of an initial point and a matrix size in some embodiments.

FIGS. 3, 4, and 5 are flow charts which may be implemented in hardware. They may also be implemented in software or firmware, in which case they may be embodied on a non-transitory computer readable medium, such as an optical, magnetic, or semiconductor memory. The non-transitory medium stores instructions for execution by a processor. Examples of such a processor or controller may include the analytics engine 20 and suitable non-transitory media may include the main memory 28 and the external memory 22, as two examples.

As shown in FIG. 1, the video analytics engine 20 is coupled to a host including the central processing unit 12. The video analytics engine 20 executes instructions independently from the host central processing unit 12. However, the host central processing unit must feed the video analytics engine 20 both data and instructions and it must receive results of operations. To accomplish these tasks, without the overhead incurred in polling for completion of instruction execution, intelligent message signaled interrupts (MSI-X) may be applied in some embodiments.

To ensure data integrity for instructions that require a large data transfer to the host, the video analytics engine 20 uses a RAISE instruction that generates an MSI-X interrupt. The MSI interrupt that results not only serves as an interrupt but also carries additional information in the message data field of the interrupt to reduce the overhead involved in servicing the interrupt. Furthermore, the intelligent MSI-X interrupt controller holds off the acknowledge to the RAISE interrupt request from the instruction dispatch unit until the data transferred to the host is complete. This mechanism may ensure that an interrupt for a RAISE instruction is sent only after a successful completion of the READ or RMD instruction through the Peripheral Component Interconnect Express bus 36.

The structure of the MSI-X interface is as follows in one embodiment where IC is the video analytics engine 20, O is Out and I is In and size is in bytes.

| Port | Size | Direction w.r.t. IC | Description |
|---|---|---|---|
| misx_addr | 64 | O | The address value for the MSI-X |
| misx_data | 32 | O | The data value for the MSI-X |
| msi_req | 1 | O | Request from the application to send an MSI when MSI is enabled. Once asserted, msi_req must remain asserted until the EPC asserts msi_grant |
| mis_tc | 3 | O | Traffic Class of the MSI(-X) request, valid when msi_req is asserted |
| mis_grant | 1 | I | One-cycle pulse that indicates that the EPChas accepted the request to send an MSI(-X). After asserting msi_grant for one cycle, the EPC does not wait for msi_req to be deasserted then reasserted to generate another MSI. If msi_req remains asserted after the EPC asserts msi_grant for one cycle, the EPC will generate another MSI. |
| Cfg_msix_en | 1 | I | The MSI-X Enable bit of the MSI-X Control register in the MSI-X Capability structure |
| Cfg_msix_func_mask | 1 | I | The IC Mask bit of the MSI-X Control register in the MSI-X Capability structure |

Figure 7:
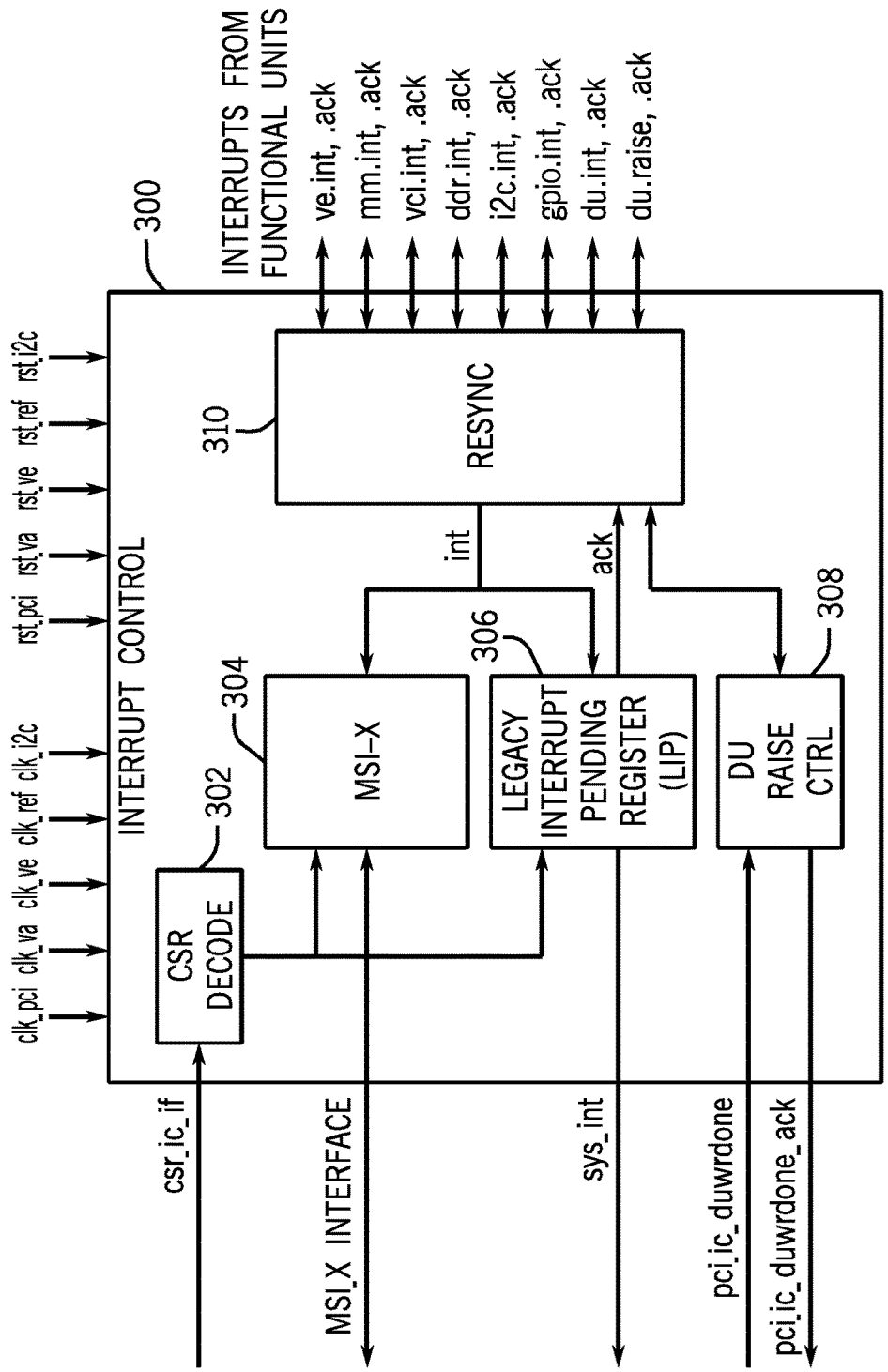
FIG. 7 is a depiction of an interrupt control for one embodiment.

Referring to FIG. 7, the interrupt controller 300 receives clocks from the various components that provide interrupts and receives reset signals from those same devices. A configuration and status register (CSR) decode 302 receives CSR inputs. It provides a signal to MSI-X interface 304. It also provides a decode signal to the legacy interrupt pending register 306. The MSI-X interface receives interrupts from a resync unit 310. The resync unit 310 receives interrupts from functional units such as a video encoder (VE) the memory matrix (MM), the video capture interface (VCI), the external memory (DDR), the I$^2$c bus (I2C), the general purpose input/output (GPIO), the dispatch unit (DU) and receives the dispatch unit RAISE signal.

The Peripheral Component Interconnect dispatch unit write done signal is provided to a dispatch unit RAISE controller 308. The controller 308 provides a dispatch unit write done acknowledge signal and receives and sends signals to the resync unit 310.

Figure 8:
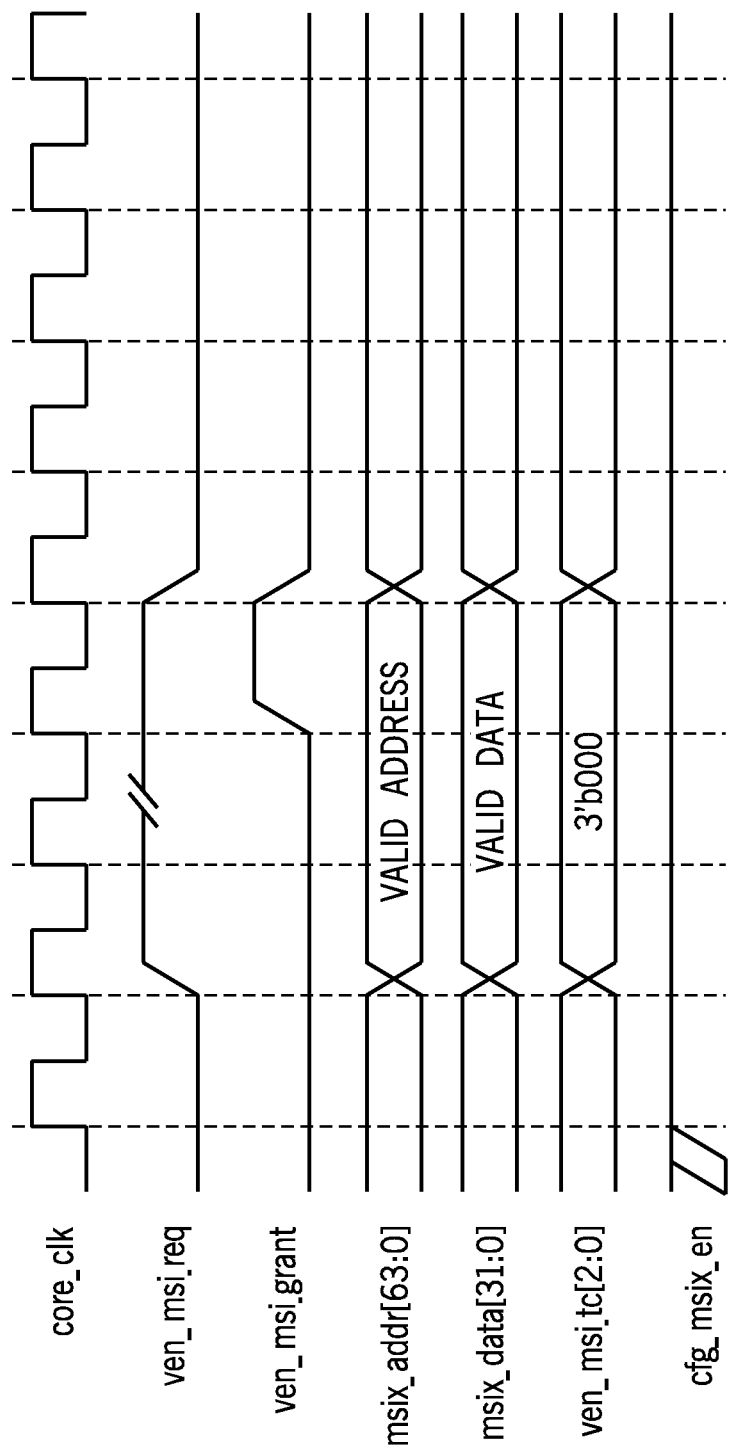
FIG. 8 is an interrupt timing diagram for one embodiment.

Thus referring to FIG. 8, timing for the various signals is illustrated. The core clock is shown at the top followed by the video encoder MSI request. Next the timing of the video encoder MSI grant is shown. This is a one-cycle pulse indicating that the request to send an MSI-x was accepted.

Following this, the MSI-X address signal is illustrated for one embodiment. This is followed by the MSI-X data signal. Finally, the video encoder MSI traffic class (tc) signal is illustrated followed by the configuration (CFG) MSI-X encoder signal. A traffic class is a type of system traffic in PCI Express, that may be assigned to a supported virtual channel for flow control purposes. The traffic class of the MSI-X request is valid when the MSI request is asserted. The cfg_msix_en is for the MSI-X enable bit of the MSI-X control register in the MSI-X capability structure.

Figure 9:
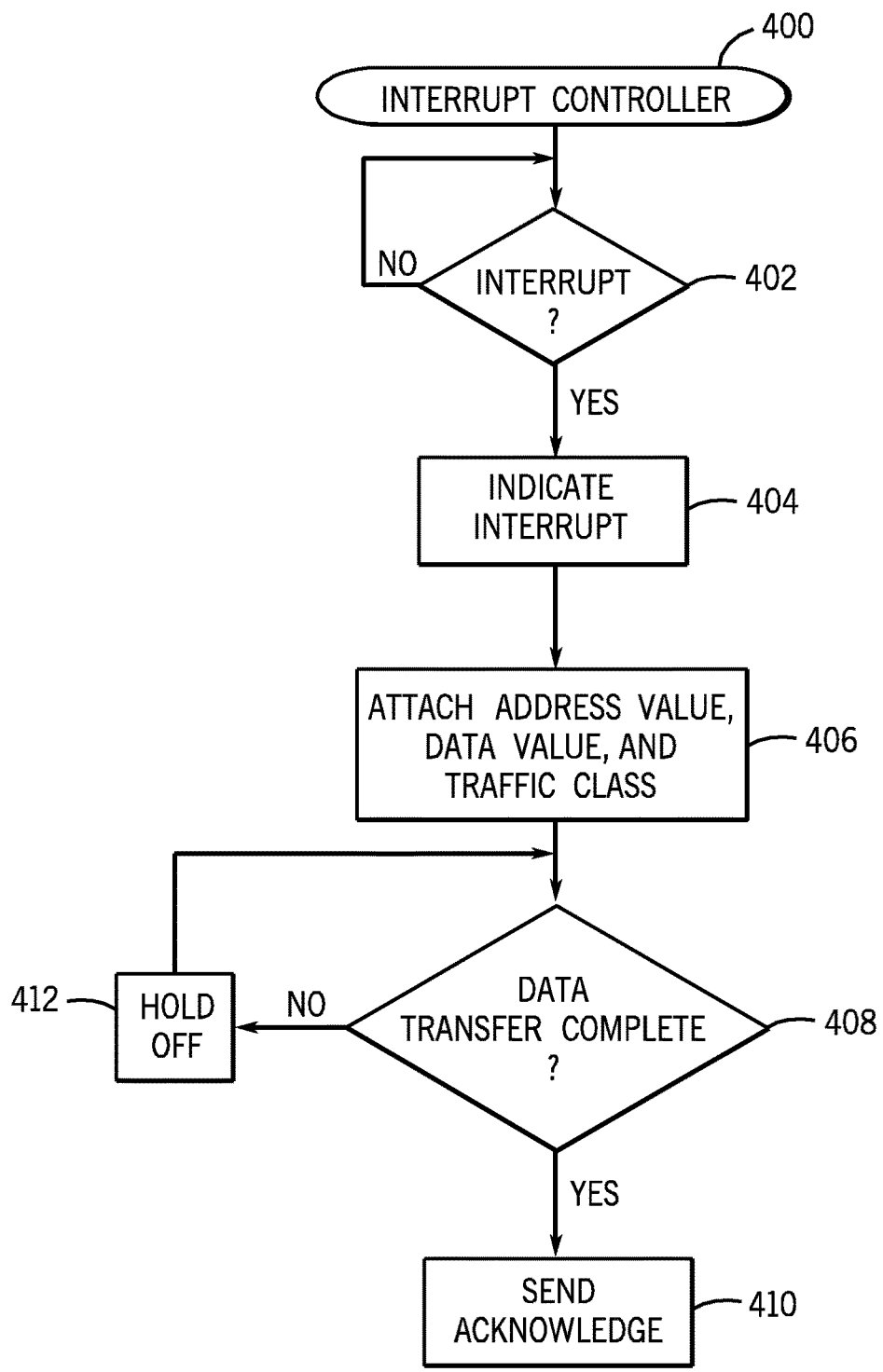
FIG. 9 is a flow chart for one embodiment.

Referring to FIG. 9, a sequence 400 for implementing an interrupt controller may be implemented in software, firmware and/or hardware. In software and firmware embodiments it may be implemented by computer executed instructions stored in a non-transitory computer readable medium such as a magnetic, optical or semiconductor storage. For example, in one embodiment, the instructions may be implemented within the interrupt controller 300.

The sequence may begin by detecting an interrupt as indicated in diamond 402. Then in block 404, the interrupt may be indicated. The interrupt may be accompanied by an address value, data value, and a traffic class as indicated in block 406 to assist in servicing the interrupt.

Then the check at diamond 408 determines whether the data transfer is complete. If so, an acknowledge may be sent as indicated in block 410. Otherwise, the acknowledge is held off as indicated in block 412.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   generating an interrupt, from an engine to a host, that indicates an interrupt;
   providing information as part of the interrupt including address and data values for the interrupt to handle the interrupt; and
   sending a single message from the engine to the host including both the interrupt and the information.

2. The method of claim 1 including providing a traffic class for the interrupt.

3. The method of claim 1 including holding off an acknowledge to the interrupt until data transfer to the host is complete.

4. A non-transitory computer readable medium storing instructions executed by a processor to perform a method for encoding multiple video streams in parallel comprising:
- generating an interrupt, from an engine to a host, that indicates an interrupt;
- providing information as part of the interrupt to handle the interrupt including address and data values for the interrupt; and
- sending a single message from the engine to the host including both the interrupt and the information.

5. The medium of claim 4 further storing instructions executed to perform a method including providing a traffic class for the interrupt.

6. The medium of claim 4 further storing instructions executed to perform a method including holding off an acknowledge to the interrupt until data transfer to the host is complete.

7. An apparatus for encoding multiple video streams in parallel comprising:
- a video analytics engine; and
- an interrupt controller to generate an interrupt, from an engine to a host, that indicates an interrupt, send a single message from the engine to the host including both the interrupt and the information, and said interrupt itself including information as part of the interrupt including address and data values for the interrupt to handle the interrupt.

8. The apparatus of claim 7, said controller to provide a traffic class for the interrupt.

9. The apparatus of claim 7, said controller to hold off an acknowledge to the interrupt until data transfer to the host is complete.

* * * * *